United States Patent
Al Reza et al.

(10) Patent No.: US 10,866,827 B2
(45) Date of Patent: Dec. 15, 2020

(54) VIRTUAL MACHINE LINKING

(71) Applicant: Rubrik, Inc., Palo Alto, CA (US)

(72) Inventors: Abdullah Al Reza, Gilroy, CA (US); Fabiano Botelho, Cupertino, CA (US); Mudit Malpani, Mountain View, CA (US); Prateek Pandey, Santa Clara, CA (US)

(73) Assignee: RUBRIK, INC., Palo Alto, CA (US)

( * ) Notice: Subject to any disclaimer, the term of this patent is extended or adjusted under 35 U.S.C. 154(b) by 0 days.

(21) Appl. No.: 16/453,140

(22) Filed: Jun. 26, 2019

(65) Prior Publication Data
US 2020/0057668 A1 Feb. 20, 2020

Related U.S. Application Data

(63) Continuation of application No. 16/371,397, filed on Apr. 1, 2019, now Pat. No. 10,528,383, which is a (Continued)

(51) Int. Cl.
| | | |
|---|---|---|
| G06F 9/44 | (2018.01) | |
| G06F 9/455 | (2018.01) | |
| G06F 11/14 | (2006.01) | |
| G06F 11/30 | (2006.01) | |
| G06F 11/32 | (2006.01) | |

(52) U.S. Cl.
CPC ...... *G06F 9/45558* (2013.01); *G06F 11/1464* (2013.01); *G06F 11/301* (2013.01); *G06F 11/3051* (2013.01); *G06F 11/32* (2013.01); *G06F 2009/45562* (2013.01);
(Continued)

(58) Field of Classification Search
CPC ........................................................ G06F 9/44
See application file for complete search history.

(56) References Cited

U.S. PATENT DOCUMENTS

6,061,349 A * 5/2000 Coile ................... H01R 31/005
370/389
6,317,775 B1 * 11/2001 Coile ................... H01R 31/005
709/201
(Continued)

OTHER PUBLICATIONS

U.S. Appl. No. 15/800,020, U.S. Pat. No. 10,310,288, filed Oct. 31, 2017 Virtual Machine Linking.
(Continued)

*Primary Examiner* — Jae U Jeon
(74) *Attorney, Agent, or Firm* — Schwegman Lundberg & Woessner, P.A.

(57) ABSTRACT

A method of identifying historical snapshots for a virtual machine (VM) is provided. Some example operations include receiving a request for a historical snapshot of a VM, the request indicating an ID for the VM. A detection is made that the ID for the VM in the request received is a new ID assigned to a VM. A determination is made whether the new ID corresponds to a newly created VM or an existing VM that has been previously registered using a previous ID, wherein the determining includes accessing a property of the VM including a use case identifier associated with an instant recovery request for a specific VM. Based on identifying that the new ID corresponds to a newly created VM, a new VM Group (VMG) object is created for the newly created VM corresponding to the new ID.

20 Claims, 9 Drawing Sheets

```
For each VM (call it vm1) in newVmList:
  If linking is enabled for the vcenter:
    Lookup index1 to see if there are existing VMs in the system with instance UUID vm1.instanceUuid
    If so:
      Say the list of existing VMs with same instance UUID is conflictingVmList
      Filter out VMs from conflictingVmList that does not have same guest OS and that are not local VMs (e.g., VMs
        replicated from a remote rubrik) since we do not link local VMs with remote VMs
      Call the new filtered list filteredConflictingVmList
      Find all snappable group IDs for VMs in filteredConflictingVmList
      If there is just one snappable group ID for all VMs in filteredConflictingVmList (that is, they all belong to same
        snappable group):
        Retrieve the SnappableGroup object from database.
        Add the new VM to the SnappableGroup object as the newest (active) member
        Update vm1.snappableGroupId so that it points to this snappable group
        Retrieve VirtualMachine object for the previous active member for the group. Call it vm2. Assign vm2.slaId to
          vm1.slaId
      Else:
        // conflicting VMs belong to multiple snappable groups. This can happen due to enabling/disabling linking for the
        // vcenter
        Retrieve all the SnappableGroup objects for the colfilcting VMs from database.
        Find the SnappableGroup that was added most recently to the system based on SnappableGroup.creation_timestamp
        Add the new VM to this SnappableGroup object as the newest (active) member
        Update vm1.snappableGroupId so that it points to this snappable group
        Retrieve VirtualMachine object for the previous active member for the group. Call it vm2. Assign vm2.slaId to
          vm1.slaId
    Else:
      // No conflicting existing VM
      Create a new SnappableGroup object and persist into database
      Add the new VM to the SnappableGroup object as the newest (active) member
      Update vm1.snappableGroupId so that it points to this snappable group
  Else:
    // VM linking is not enabled for the vcenter
    Create a new SnappableGroup object and persist into database
    Add the new VM to the SnappableGroup object as the newest (active) member
    Update vm1.snappableGroupId so that it points to this snappable group
```

Related U.S. Application Data continuation of application No. 15/800,020, filed on Oct. 31, 2017, now Pat. No. 10,310,888.

(52) U.S. Cl.
CPC ............ *G06F 2009/45583* (2013.01); *G06F 2009/45595* (2013.01); *G06F 2201/84* (2013.01)

(56) References Cited

U.S. PATENT DOCUMENTS

| | | | |
|---|---|---|---|
| 8,185,834 B2 | 5/2012 | King et al. | |
| 8,185,894 B1 | 5/2012 | Watson et al. | |
| 8,825,653 B1 | 9/2014 | Wang et al. | |
| 8,825,720 B1 | 9/2014 | Xie et al. | |
| 9,317,218 B1 | 4/2016 | Botelho et al. | |
| 9,367,448 B1 | 6/2016 | Botelho et al. | |
| 9,405,761 B1 | 8/2016 | Botelho et al. | |
| 9,424,185 B1 | 8/2016 | Botelho et al. | |
| 9,430,164 B1 | 8/2016 | Botelho et al. | |
| 9,432,192 B1 | 8/2016 | Pogde et al. | |
| 9,460,389 B1 | 10/2016 | Botelho et al. | |
| 9,483,494 B1 | 11/2016 | Pang et al. | |
| 9,594,753 B1 | 3/2017 | Pang et al. | |
| 9,804,890 B1 | 10/2017 | Pai et al. | |
| 10,055,299 B2* | 8/2018 | Bender | G06F 11/1451 |
| 10,310,888 B2 | 6/2019 | Al Reza et al. | |
| 10,528,383 B2* | 1/2020 | Al Reza | G06F 11/1464 |
| 2011/0137189 A1* | 6/2011 | Kuo | A61B 5/0245 600/509 |
| 2011/0197189 A1 | 8/2011 | Wagner et al. | |
| 2015/0324260 A1* | 11/2015 | Mutalik | G06F 11/1469 714/703 |
| 2015/0363438 A1 | 12/2015 | Botelho | |
| 2016/0034487 A1 | 2/2016 | Pang et al. | |
| 2016/0124977 A1 | 5/2016 | Jain et al. | |
| 2018/0059973 A1 | 3/2018 | Jain et al. | |
| 2019/0129739 A1 | 5/2019 | Al Reza et al. | |
| 2019/0227831 A1 | 7/2019 | Al Reza et al. | |
| 2020/0050475 A1* | 2/2020 | Al Reza | G06F 11/1464 |

OTHER PUBLICATIONS

U.S. Appl. No. 16/371,397, filed Apr. 1, 2019 Virtual Machine Linking.
"U.S. Appl. No. 15/800,020, Preliminary Amendment filed Jun. 28, 2018", 3 pgs.
"U.S. Appl. No. 15/800,020, Notice of Allowance date Feb. 28, 2019", 19 pgs.
"U.S. Appl. No. 15/800,020, Notice of Allowability dated Mar. 26, 2019", 2 pgs.
"U.S. Appl. No. 16/371,397, Notice of Allowance dated Aug. 22, 2019", 18 pgs.
Rubrik, "Technology Overview and How It Works", Rubrik Cloud Data Management, (Sep. 26, 2017), 22 pgs.
"U.S. Appl. No. 16/371,397, Corrected Notice of Allowability dated Dec. 3, 2019", 2 pages.

* cited by examiner

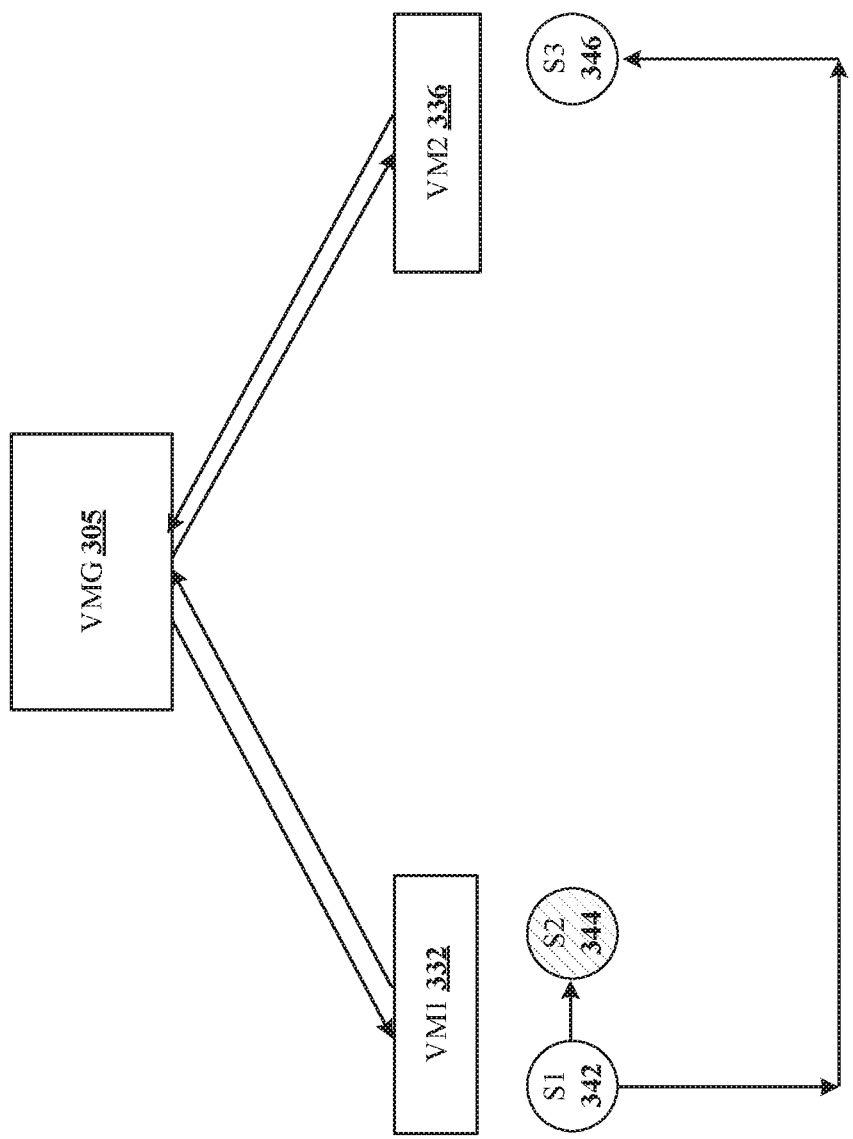

Edit SLA Domain

SLA Domain Name
Gold

Service Level Agreement
Choose how often we take snapshots and the length of time we keep them.

Snapshot
Take Snapshots:   Every (Hours) —— 434   Keep Snapshots:   For (Days) —— 448
                  444 —— 4                                  3

Every (Days)                              For (Days)
                  454 —— 1                                  458 —— 30

Every (Months)                            For (Years)
                  464 —— 1                                  468 —— 1

Every (Years)                             For (Years)
                  1                                         478 —— 2

Local retention set to 2 Years.

Snapshot Window
Take snapshots from:    ▽   to    ▽
                        474 —— First Opportunity Take first full between:   ▽   at   ▽

Cancel                         Configure Remote Settings         Edit

```
For each VM (call it vm1) in newVmList:
    If linking is enabled for the vcenter:
        Lookup indexUl to see if there are existing VMs in the system with instance UUID vm1.instanceUuid
        If so:
            Say the list of existing VMs with same instance UUID is conflictingVmList
            Filter out VMs from conflictingVmList that does not have same guest OS and that are not local VMs (e.g., VMs
                replicated from a remote rubrik) since we do not link local VMs with remote VMs
            Call the new filtered list filteredConflictingVmList
            Find all snappable group IDs for VMs in filteredConflictingVmList
            If there is just one snappable group ID for all VMs in filteredConflictingVmList (that is, they all belong to same
                snappable group):
                Retrieve the SnappableGroup object from database.
                Add the new VM to the SnappableGroup object as the newest (active) member
                Update vm1.snappableGroupId so that it points to this snappable group
                Retrieve VirtualMachine object for the previous active member for the group. Call it vm2. Assign vm2.slaId to
                    vm1.slaId
            Else:
                // conflicting VMs belong to multiple snappable groups. This can happen due to enabling/disabling linking for the
                // vcenter
                Retrieve all the SnappableGroup objects for the colflicting VMs from database.
                Find the SnappableGroup that was added most recently to the system based on SnappableGroup.creation_timestamp
                Add the new VM to this SnappableGroup object as the newest (active) member
                Update vm1.snappableGroupId so that it points to this snappable group
                Retrieve VirtualMachine object for the previous active member for the group. Call it vm2. Assign vm2.slaId to
                    vm1.slaId
        Else:
            // No conflicting existing VM
            Create a new SnappableGroup object and persist into database
            Add the new VM to the SnappableGroup object as the newest (active) member
            Update vm1.snappableGroupId so that it points to this snappable group
    Else:
        // VM linking is not enabled for the vcenter
        Create a new SnappableGroup object and persist into database
        Add the new VM to the SnappableGroup object as the newest (active) member
        Update vm1.snappableGroupId so that it points to this snappable group
```

FIG. 7

VIRTUAL MACHINE LINKING

CLAIM OF PRIORITY

This application is a continuation of and claims the benefit of priority of U.S. application Ser. No. 16/371,397, filed Apr. 1, 2019, which is a continuation of and claims the benefit of priority of U.S. application Ser. No. 15/800,020, filed Oct. 31, 2017, each of which is hereby incorporated by reference in its entirety.

RELATED APPLICATIONS

This application is also related to U.S. Patent Application No. US 2016/0124977 A1 entitled "Data Management System," by Arvind Jain, et al., filed Feb. 20, 2015, which is incorporated by reference herein.

This application is also related to U.S. Provisional Patent Application No. 62/570,436 entitled "Incremental File System Backup Using a Pseudo-Virtual Disk," by Soham Mazumdar, filed Oct. 10, 2017, which is incorporated by reference herein.

BACKGROUND

A virtual machine (VM) is an emulation of a computer system. Virtual machines are based on computer architectures and provide functionality of a physical computer. System virtual machines, also referred to as virtualization VMs, provide a substitute for a real machine—providing functionality needed to execute entire operating systems. In contrast, process virtual machines are designed to execute computer programs in a platform-independent environment.

VMs have extensive data security requirements and typically need to be continuously available to deliver services to customers. For disaster recovery and avoidance, service providers that utilize VMs need to avoid data corruption and service lapses to customers, for services delivered both by an external machine and via the cloud.

Virtual machine replication (VM replication) is a type of VM protection that takes a copy, also referred to as a snapshot, of the VM as it is at the present time and copies it to another VM. Users of VMs need to be able to replicate their VMs to protect their data locally within a single site and to isolate data between two sites.

VM backup and replication are essential parts of a data protection plan. Backup and replication are both necessary to keep a source virtual machine's data so it can be restored on demand. VM backup and replication have different objectives.

VM backups are intended to store the VM data for as long as deemed necessary to make it feasible to go back in time and restore what was lost. As the main objective of backups is long-term data storage, various data reduction techniques are typically used by backup software to reduce the backup size and fit the data into the smallest amount of disk space possible. This includes skipping unnecessary swap data, data compression, and data deduplication, which removes the duplicate blocks of data and replaces them with references to the existing ones. Because VM backups are compressed and deduplicated to save storage space, they no longer look like VMs and are often stored in a special format that a backup software app can understand. Because a VM backup is just a set of files, the backup repository is a folder, which can be located anywhere: on a dedicated server, storage area network (SAN) or in a cloud.

Modern backup software allows for various types of recovery from backups: professionals can near-instantly restore individual files, application objects, or even entire VMs directly from compressed and deduplicated backups, without running the full VM restore process first. Backups of virtual infrastructure are critical but when something happens to multiple virtual machines or perhaps an entire site, it becomes necessary to restore the data either back to the original virtual machine or recreate the entire virtual machine from that backup data.

VM replication creates an exact copy of the source VM and puts the copy on target storage, to circumvent the time required to bring data or services back online in the event of a site-wide failure or severely impaired primary site, whether it be hardware failure, a natural disaster, malware, or self-inflicted impairment. VM replicas, the result of replication, are usable to restore the VMs as soon as possible.

A hypervisor is a virtual machine monitor that uses native execution to share and manage hardware, allowing for multiple environments which are isolated from one another, yet exist on the same physical machine hardware. For example, third-party service VMware© utilizes ESXi architecture as a bare-metal hypervisor that installs directly onto a physical server, enabling it to be partitioned into multiple logical servers referred to as VMs. In one example, VMware© vCenter, a centralized management application for managing VMs and ESXi hosts centrally, identifies a VM by an ID that is assigned by the resource manager when the virtual machine is registered.

Tracking of snapshots that back up VMs can get disrupted when a VM is unregistered and then re-registered or if the VM is moved to a different vCenter via the hypervisor. Two problems are associated with unregistering and reregistering a VM, or with moving a VM to a different vCenter. First, the new VM has no history of the snapshots taken by the old VM, even though the new VM and old VM are different reincarnations of the same VM. When the history of snapshots associated with a given VM is reset, compliance enforcement becomes much more complicated from a customer perspective. Secondly, the new VM must take a full snapshot because no base snapshot is associated with the new VM. The creation of a new snapshot includes capturing a lot of data, so requires a lot of time.

An opportunity arises to keep a snapshot history, stored in sequence, and spanning multiple VMs, even when VMs are unregistered and reregistered and when VMs are moved from one data center to another data center, and to take incremental snapshots across multiple linked VMs.

SUMMARY

One implementation of the disclosed technology teaches a method of identifying historical snapshots for a VM: receiving a request indicating an ID for a historical snapshot of a VM; detecting that the ID for the VM in the request received is a new ID assigned to a VM by an external machine hosting VMs in a hosted service environment; and determining whether the new ID corresponds to a newly created VM created by the external machine or an existing VM that has been previously registered with the external machine using a previous ID. Upon identifying that the new ID corresponds to a newly created VM, the disclosed method includes creating a new VM Group (abbreviated VMG) object for the newly created VM and corresponding to the new ID; otherwise if the new ID does not correspond to a newly created VM, then identifying an existing VMG object for the existing VM. The method also includes adding the new ID to the existing VMG object, thereby holding identifiers for the newly created VM and the existing VM together in a single object. The disclosed method further includes, using the existing VMG object for determining one or more snapshot histories of historical snapshots from snapshot histories stored in association with a previous ID and snapshot histories stored in association with the new ID; and returning at least one historical snapshot from the snapshot histories determined.

Particular aspects of the technology disclosed are described in the claims, specification and drawings.

BRIEF DESCRIPTION OF THE DRAWINGS

FIG. 3 illustrates the block diagram for taking an incremental snapshot across multiple linked VMs.

FIG. 4 shows an example dialog box within the Rubrik platform for customizing a VM SLA.

FIG. 5 shows an example UI screen for viewing the snapshots for a selected VM, by calendar month.

FIG. 6 shows an example UI screen for viewing multiple snapshots for a day that has been selected on the calendar shown in FIG. 5.

FIG. 7 shows pseudocode for determining whether the new ID corresponds to a newly created VM created by the external machine or an existing VM that has been previously registered with the external machine using a previous ID.

DETAILED DESCRIPTION

Figure 1:
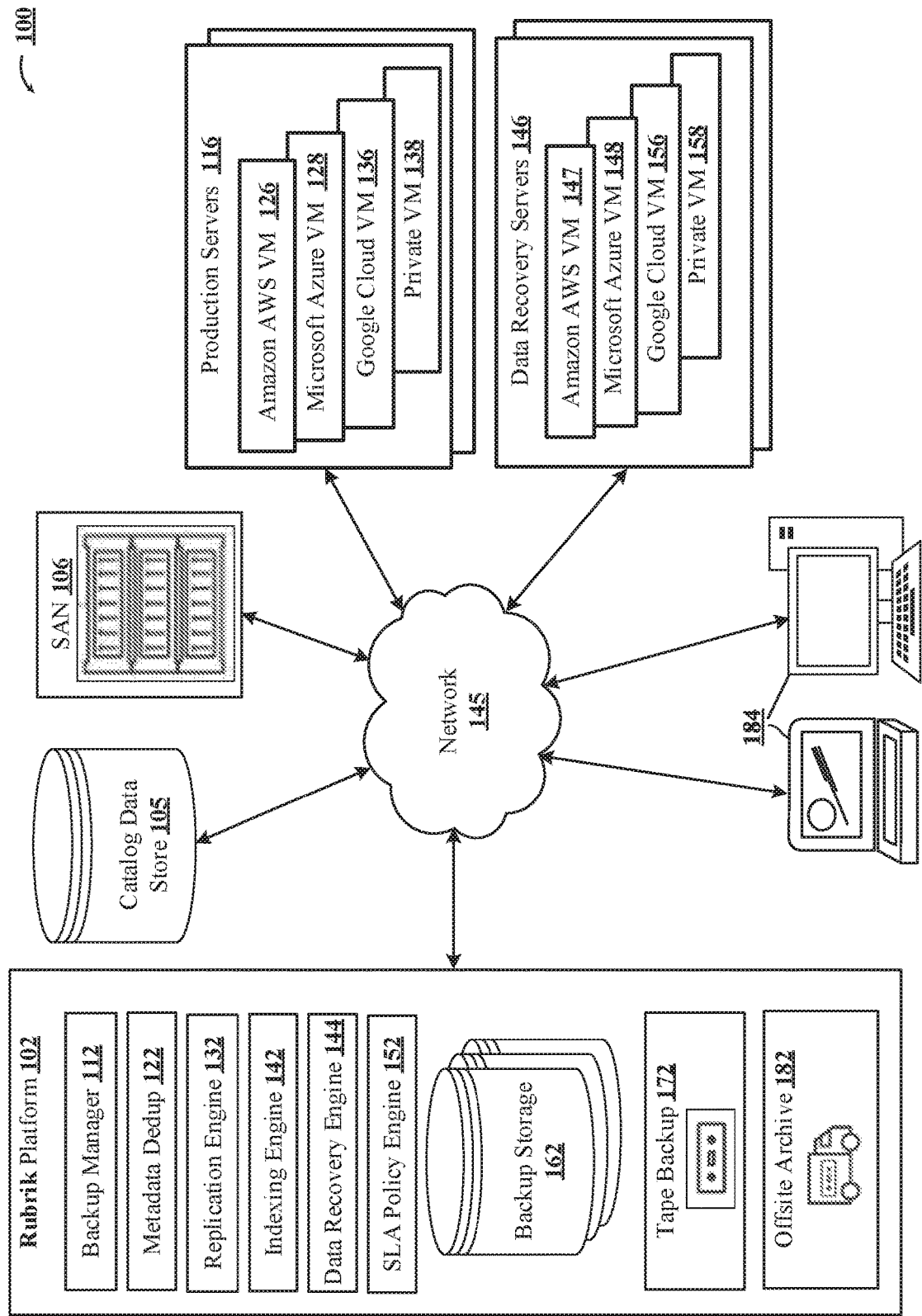
FIG. 1 shows an environment for identifying historical snapshots for VMs, across machines and in various registration scenarios.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

In many large organizations with multiple data centers, it is common to have regular fail-over tests across data centers to ensure that the company is prepared for disaster recovery. In some cases the company replicates between data centers for data recovery and do a complete failover between data centers every six 6 months. That is, data center roles are reversed every six months between production servers and data recovery servers.

The disclosed technology makes it possible keep a snapshot history, stored in sequence, and spanning multiple VMs, even when VMs are unregistered and reregistered and when VMs are moved from one data center to another data center, and to take incremental snapshots across multiple linked VMs.

A resource manager identifies virtual machines (VM) by an ID that is assigned by the resource manager when the VM is registered. For example, in VMware©, the vCenter assigns a managed object reference ID (MOID) when a VM is registered to the vCenter. If a VM is unregistered and then re-registered or if the VM is moved to a different vCenter, this MOID changes. When the MOID changes, this VM appears as a new VM in a platform that unifies services across the data center and cloud.

Tracking of snapshots that back up VMs can get disrupted when a VM is unregistered and then re-registered or if the VM is moved to a different vCenter via the hypervisor. Two problems associated with unregistering and reregistering a VM, or with moving a VM to a different vCenter include the new VM having no history of the snapshots taken by the old VM, even though the new VM and old VM are different reincarnations of the same VM, and also, a full snapshot is required for the new VM because no base snapshot is associated with the new VM, resulting in a longer time delay before a snapshot of the newly registered VM is available. An environment for identifying historical snapshots—for a VM that has been unregistered and re-registered, and for a VM that has been moved from one vCenter to a different vCenter is described next.

FIG. 1 shows an environment 100 for identifying historical snapshots for VMs, across machines and in various registration scenarios. Rubrik platform 102 includes backup manager 112 for unifying backup services, metadata dedup 122 for deduplicating metadata associated with the VMs, replication engine 132 for managing replicating of the VMs, indexing engine 142 for listing VMs for tracking, and data recovery engine 144 for copy data management.

Also included in environment 100, SLA policy engine 152 includes intelligence to determine when to back things up to meet terms of service level agreements (SLA); and backup storage 162, tape backup 172 and offsite archive 182 are available for securely storing and archiving identified backup data across the data center and cloud. In one example implementation of platform 102, VMware© vCenter, a centralized management application for managing VMs and ESXi hosts centrally, identifies a VM by an ID that is assigned by the resource manager when the virtual machine is registered and tracked by indexing engine 142. VMware© vSphere cloud computing virtualization platform client accesses the vCenter server and assigns a managed object reference ID (MOID) when a VM is registered to the vCenter. In another example implementation, platform 102 can utilize a different hypervisor, such as System Center Virtual Machine Manager (SCVMM) for virtual machine management, and in a third example implementation, Nutanix hyper-converged appliances can be utilized in Rubrik platform 102 for identifying historical snapshots for VMs.

Environment 100 also includes catalog data store 105, which is kept updated with deduplicated data via metadata dedup 122 in platform 102; and SAN 106 (storage area network)—a repository which can be located locally on a dedicated server or in the cloud, for storing VM backup folders. Additionally, environment 100 includes production servers 116 with multiple VMs, which can include Amazon AWS VM 126, Microsoft Azure VM 128, Google Cloud VM 136 and private VM 138. Multiple VMs of each type can typically run on a single production server and multiple production servers can be managed via platform 102. Further included in environment 100 are data recovery servers 146 for multiple VMs, which can include Amazon AWS VM 147, Microsoft Azure VM 148, Google Cloud VM 156 and private VM 158 platforms that upload snapshots. In some implementations, data recovery servers 146 are in the cloud and in other cases data recovery servers 146 are on premise hardware. The disclosed VM linking links the VMs as described infra. When the metadata of a VM gets uploaded to the cloud, additional info such as the ID of the VM group to which the VM belongs can get added. Depending on the use case, metadata can be stored with the group. The metadata will depend on the VM type and can be represented as a serialized JSON object. In one example instance, additional metadata can include a map from a new binary large object (blob) store group ID to an old blob store group Id, in order to preserve a single chain to optimize storage utilization.

User computing device 184, also included in environment 100, provides an interface for managing platform 102 for administering services, including backup, instant recovery, replication, search, analytics, archival, compliance, and copy data management across the data center and cloud. In some implementations, user computing devices 184 can be a personal computer, laptop computer, tablet computer, smartphone, personal digital assistant (PDA), digital image capture devices, and the like.

Modules can be communicably coupled via a different network connection. For example, platform 102 can be coupled via the network 145 (e.g., the Internet) with production servers 116 coupled to a direct network link, and can additionally be coupled via a direct link to data recovery servers 146. In some implementations, user computing device 184 may be connected via a WiFi hotspot.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), ZWave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

An important goal when administering backup and replication services is to avoid taking full backups repeatedly for the same VM, and instead completing an incremental backup based on an earlier snapshot of the VM. More than one VM can represent the same underlying VM in terms of data. When a VM is unregistered and then re-registered or when the VM is moved to a different vCenter, the managed object reference ID (MOID) changes. When the MOID changes, the VM appears as a new VM.

The disclosed technology makes it possible to keep a snapshot history spanning multiple VMs. To identify multiple VMs as different incarnations of the same VM, the disclosed technology looks at other properties, such as natural Universal Unique Identifier (UUID) of the VM. A UUID is a 128-bit number used to uniquely identify some object or entity on the Internet. Depending on the specific mechanisms used, a UUID is either guaranteed to be different or is, at least, extremely likely to be different from any other UUID generated until 3400 A.D. After identifying the VM objects that represent same underlying VM, a high level VM group object gets created as a mechanism for consolidating snapshot histories so that all snapshots across the same underlying VMs can be reported as snapshots for the same underlying VM.

Figure 2:
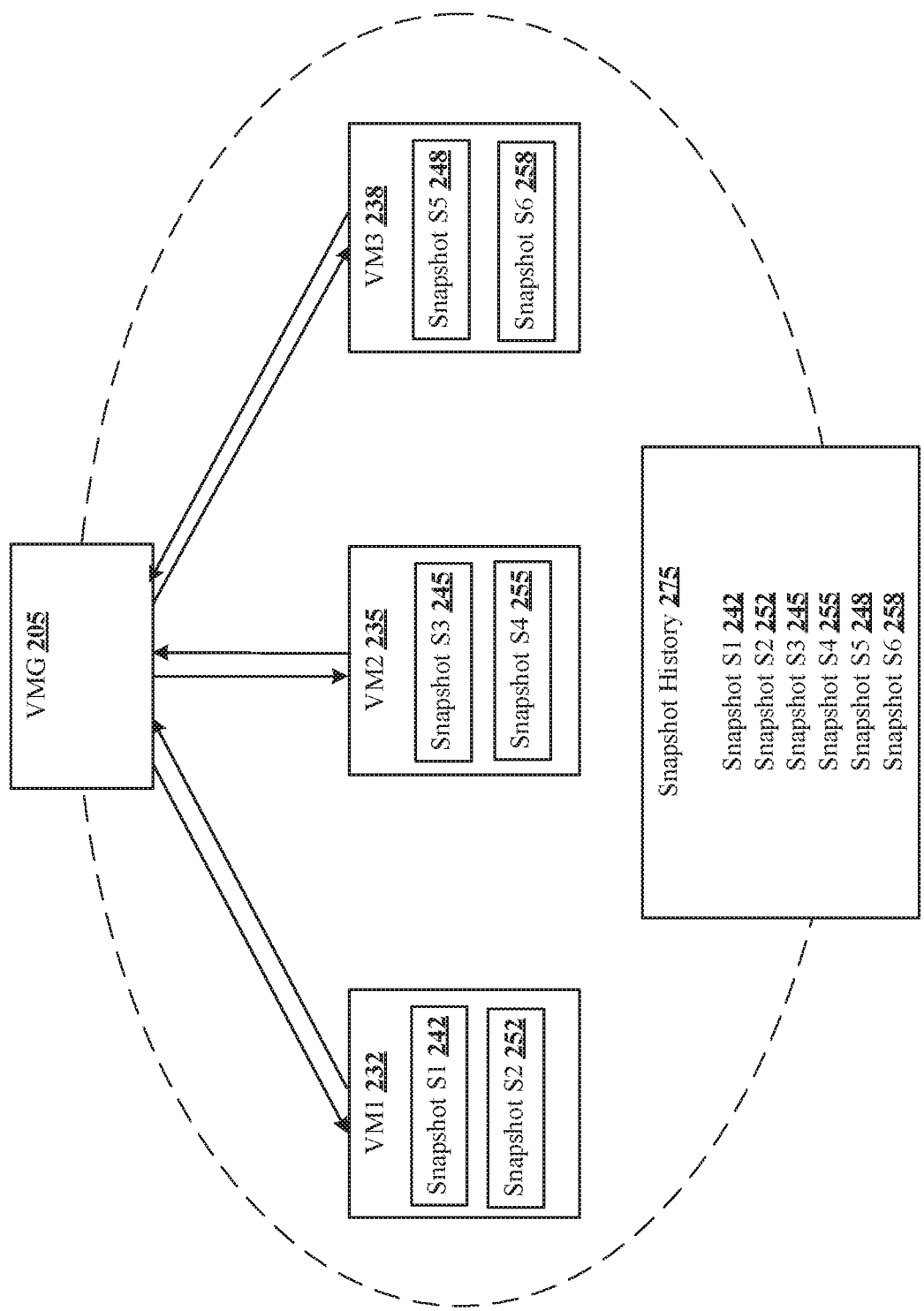
FIG. 2 illustrates the relationship between multiple VMs and a virtual machine group for keeping a snapshot history spanning multiple VMs.

FIG. 2 illustrates the relationship between multiple VMs 200 and virtual machine group (VMG) 205 for keeping a snapshot history spanning multiple VMs. In this simple example, three different incarnations of the same VM 232, 235, 238 include two snapshots each. VM 232 includes snapshot 1 242 and snapshot 2 252. VM 235 includes snapshot 3 245 and snapshot 4 255. VM 238 includes snapshot 5 248 and snapshot 6 258. The three VMs 232, 235, 238 represent three incarnations of the same underlying VM with VM 3 238 as the currently active VM. VMG 205 points to VM1 232, VM2 235 and VM3 238. VM1 232, VM2 235 and VM3 238 also point to VMG 205. To list snapshots of VM3 238, VM3 238 knows that it belongs to VMG 205 and from there it "knows" other member VMs VM1 232 and VM2 235 and extracts their snapshots. Disclosed platform 102 creates a merged list of all of the snapshot history 275 and reports S1 242, S2 252, S3 245, S4 255, S5 248 and S6 258, to ensure that snapshot history is preserved across reincarnations of the VM.

The disclosed technology also makes it viable to take an incremental snapshot across multiple linked VMs. In addition to keeping a history of all snapshots, new snapshots need to be incremental snapshots of existing snapshots across all VMs in a VMG. When a VM takes a new snapshot, it needs to detect a base snapshot to be able to make the snapshot incremental.

FIG. 3 illustrates the block diagram for taking an incremental snapshot across multiple linked VMs, for multiple VMs and virtual machine group (VMG) 305. A search across all snapshots across all linked VMs, using VMG 305, results in finding the most recent snapshot that is not expired yet, and then taking the new incremental snapshot relative to that snapshot. That is, a snapshot of one VM can be based off a snapshot from another older VM as long as both VMs represent same underlying VM. VM1 332 and VM2 336 are reincarnations of same VM and are linked in VMG 305. VM1 332 has snapshots SI 342 and S2 344 where S2 344 is an increment of SI 342. When VM2 336 takes its next snapshot, it searches for all snapshots in VMG 305, which includes SI 342 and S2 344. For the FIG. 3 example, assume that S2 344 is expired, so is shown as shaded. Thus, SI 342 is the most recent snapshot that is not yet expired and therefore is the snapshot to be used as the base for the next snapshot S3 346 of VM2 336. Note that VM2 336 is basing its snapshot on snapshots from other VMs which leads to cross-VM snapshot chains.

FIG. 4 shows an example "Edit SLA Domain" dialog box 400 within the user interface for Rubrik platform 102 for customizing a VM SLA—an official commitment that prevails between service provider and client, with specific aspects of the service, including how often to take VM snapshots and how long to keep the snapshots, as agreed between the service provider and the service user. In the example shown, a VM snapshot is to be taken once every four hours 434, once every day 444, once every month 454 and once every year 464. The four-hour snapshots are to be kept for three days 448, the daily snapshots are to be retained for thirty days 458, the monthly snapshots are kept for one month 468 and the yearly snapshots are to be retained for two years 478. Note that the first full snapshot is to be taken at the first opportunity 474.

The configured SLA gets propagated to the linked VM. SLAs are tracked per VM object with one object per MOID. When a new VM and thereby a new MOID is linked to an existing set of VMs, the SLA of the active newest VM object in the VMG is assigned to the new VM object, which becomes the new active VM in the group. In one implementation, if the old VM was inheriting SLA from higher-level objects from its hierarchy such as the host, a folder or vCenter, the new VM object will forget that SLA and go back to inheriting mode and will inherit SLA from the higher-level objects in its new hierarchy. If the higher-level objects in its new hierarchy do not have an SLA assigned to them, the new VM will show no SLA. If an SLA is assigned to one of the higher-level objects, the new VM will pick it up. Different SLA propagation scenarios can be implemented for other use cases. In one case, if the customer wants to preserve inherited SLAs of the VMs in the new vCenter, they may choose to bulk-assign direct SLAs to the VMs via the UI before migration of their VMs.

Figure 5:
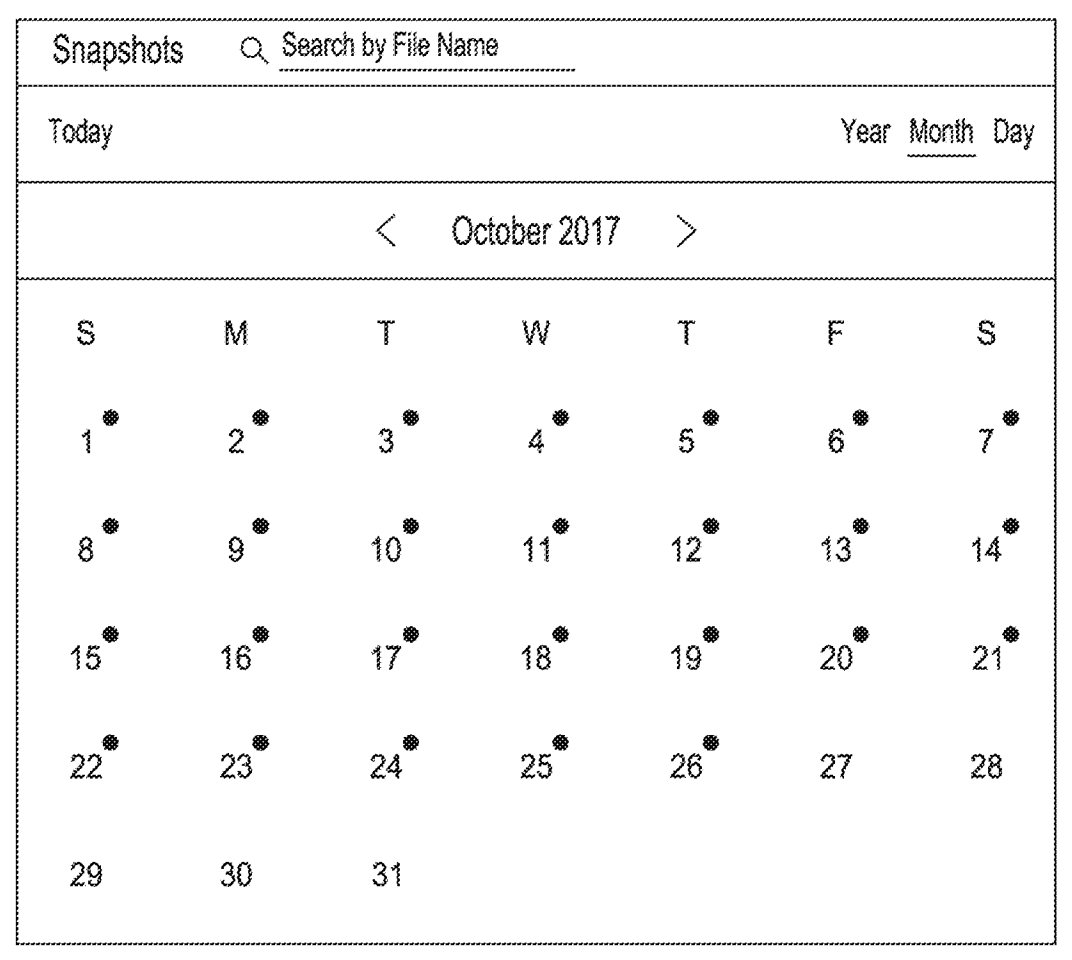
Figure 6:
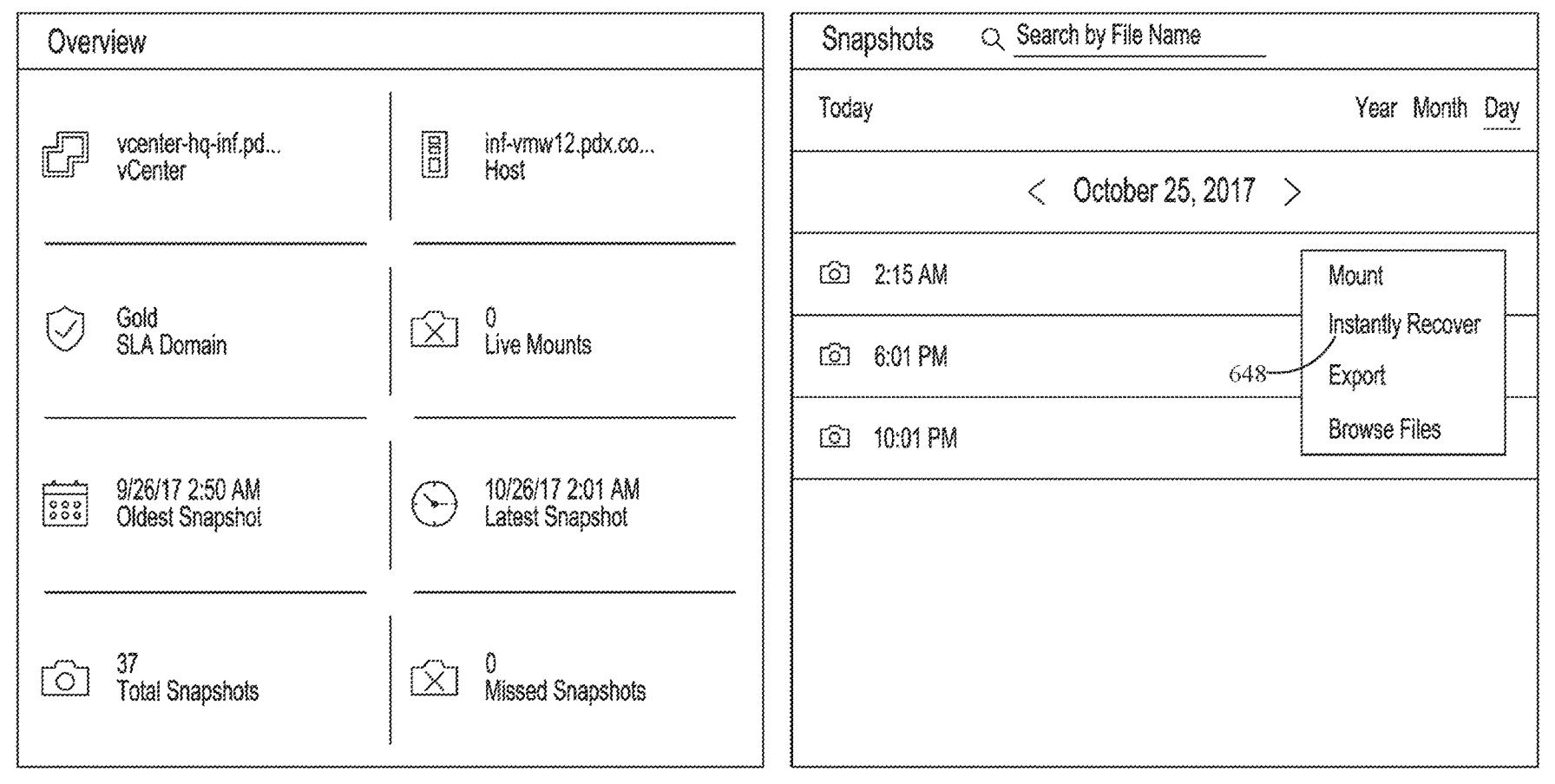

FIG. 5 shows an example UI screen of platform 102 for viewing the snapshots for a selected VM, by calendar month, with a dot on every date that has a stored snapshot. FIG. 6 shows an example UI screen for viewing multiple snapshots for a day that has been selected on the calendar shown in FIG. 5—Oct. 25, 2017 in this example. For an instant recovery request 648 for a VM, the disclosed VM linking technology considers the use case identifier property that signals an instant recovery request for the specific VM. For instant recovery, a user selects one of the snapshots of a VM, or a chain of VMs with VM linking, to request a new, instantly recovered VM from the snapshot data—going back to a previous time via the snapshot VM history. Determining whether the new ID corresponds to a new VM includes looking at some property of the VM—in this example, a use case identifier that signals an instant recovery request for a specific VM. The newly recovered VM has a new MOID and a new instance LUTD. With the disclosed VM linking technology, even though the instance LUTD is different, the recovered VM is known to be the same VM, by virtue of the use case identifier. That is, Platform 102 links the newly recovered VM with the old VM chain—putting the new VM in the VMG of the previously existing VM. Thus, the recovered VM has access to the entire history of snapshots and is able to take an incremental snapshot rather than a full snapshot at the next time specified by the SLA.

A conflict can occur when a new VM not yet added to the system may represent the same VMs already in the system. Upon receiving a request for a historical snapshot of a VM with an associated ID, the next step is detecting that the ID for the VM in the request received is a new ID assigned to a VM by an external machine hosting VMs in a hosted service environment.

There are many different jobs in a system. Conflict detection and resolution is done on the vCenter refresh job, by looking at local refresh jobs and also any source refresh job that is pulling metadata from a remote source. Conflict resolution is accomplished by adding the VM to the appropriate VMG. Before the new VM is added to the system, there is no job for it, since it was not yet instantiated. Other jobs, including snapshot and replication, do not detect or resolve conflict. The snapshot and replication jobs see a view of the system in which any conflicts have already been resolved by the vCenter refresh job. Once the VM has been added to the system, the conflict has been resolved already.

Conflict detection and resolution happens when a vCenter is refreshed and one or more new VMs is are detected. After discovering the new VMs in this vCenter that are not already managed via platform 102 a decision is made as to whether the new VM needs to be added as a newly created, independent VM or needs to be linked to an existing VM or chain of VMs that have been previously registered with the external machine, using a previous ID.

The next paragraphs describe the data structures in use for one example implementation of determining whether the new ID corresponds to a newly created VM created by the external machine or an existing VM that has been previously registered with the external machine using a previous ID. First, an index gets built of existing VMs according to their instance UUIDs, called indexl.

```
case class ExistingVmIndexEntry(
  instanceUuid: String
  vmIds: List[String]
)
val indexl: List[ExistingVmIndexEntry]
```

Described next is the list, called newVMList, of just-detected new VMs that have not yet been added to the system, with the relevant fields for VM linking of VM objects and corresponding database objects.

```
case class VirtualMachine(
  id: String
  instanceUuid: String
  vmGroupId: String
  slaId: String
)
```

The members in the set are sorted from oldest to newest incarnation of the object this group represents.

```
{
  "column-name": "member_list",
  "column-type": "text"
},
```

The database schema is shown next for a VMG active member: the group represents a single logical entity that will have more than one incarnation during the lifetime of the system.

```
{
    "column-name": "active_member",
    "column-type": "text"
},
```

Depending on the use case, some metadata may need to be stored along with the group. The metadata will depend on the type, and it needs to be represented as a serialized JSON object. In one use case example, this metadata can be used to store a map from new blob store group id to old blob store group id in order to preserve a single chain, to optimize storage utilization.

```
    "column-name": "json spec",
    "column-type": "text"
    // Uuid to carry out atomic updates
    "column-name": "atomic_uuid",
    "column-type": "uuid"
    // A VM group is never deleted. Instead it is marked as
deleted using this flag.
    "column-name": "is archived",
    "column-type": "boolean"
```

The VM needs to point to the VMG to which it belongs. The schema change listed below is utilized to account for the VM.

```
{
    "action": "add-column",
    "keyspace": "sd",
    "table-name": "VM",
    // VMG id attached to every VM that is part of the group.
    "column-name": "vm_group_id",
    "column-type": "text"
}
```

FIG. 7 shows pseudocode for determining whether the new ID corresponds to a newly created VM created by the external machine or an existing VM that has been previously registered with the external machine using a previous ID. That is, the pseudocode outlines the conflict detection and resolution algorithm for adding a newly detected VM to the appropriate VMG. The algorithm utilizes the data structures described earlier. For some use cases, for creating VM groups, a distributed throttle/semaphore mechanism can be used to synchronize, to avoid having multiple jobs operating on the same blob store chain concurrently.

Figure 8:
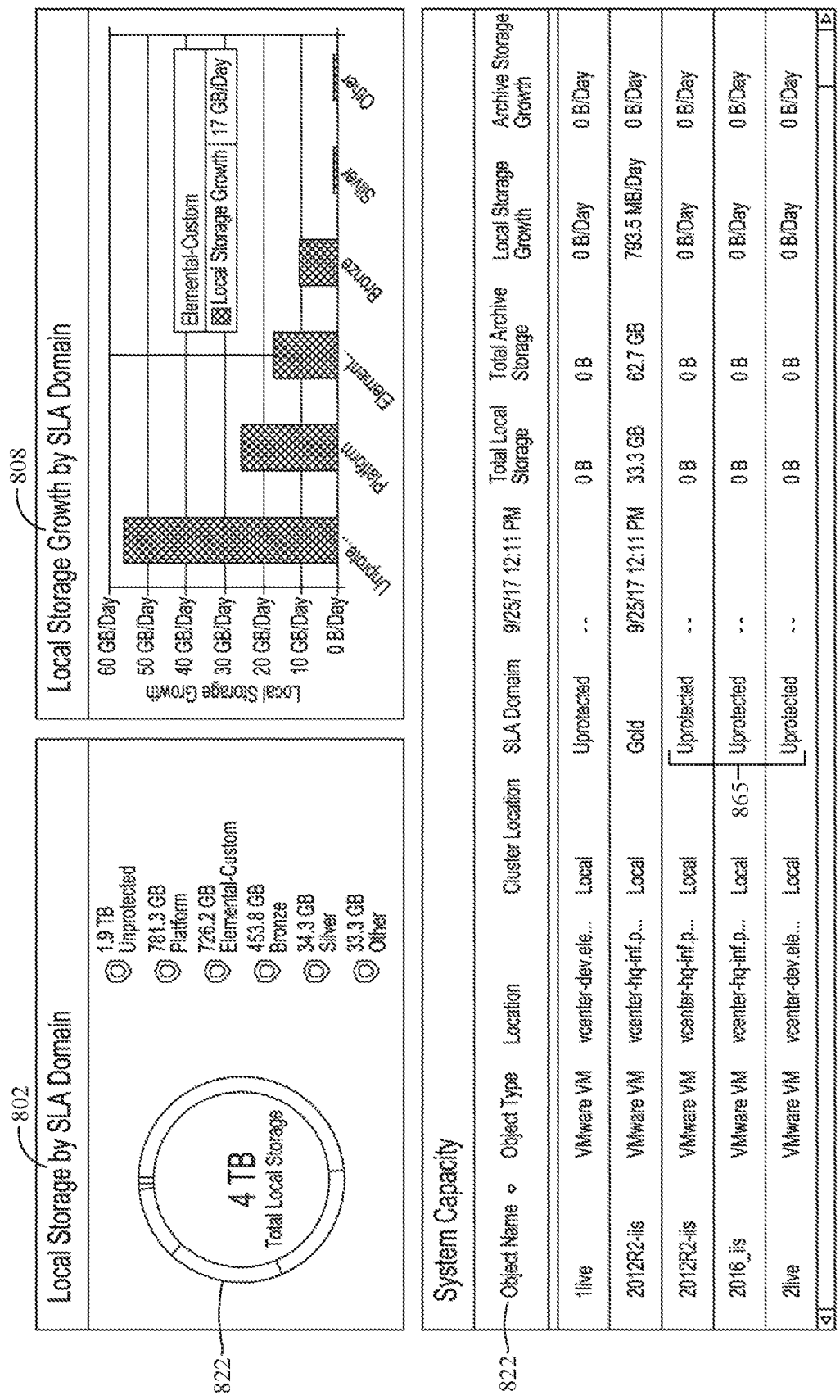
FIG. 8 shows a user interface dashboard of a system report that includes local storage by SLA domain, local storage growth by SLA domain, and a list of VM objects by name, object type, SLA domain and location.

FIG. 8 shows a platform 102 user interface dashboard of a system report that includes local storage by SLA domain 802, local storage growth by SLA domain 808, and a list of VM objects 852 by name, object type, SLA domain and location. The report illustrates the clustered architecture with the file system distributed across the nodes. The UI also makes it possible to view backups taking place, see failures such as a database offline. In the example report of FIG. 8, three VMs are listed as unprotected 865 because they are not associated with a SLA Domain. The total local storage utilized is 4 TB 822. In general, the dashboard is usable for managing VMs and data end to end. When VMs get added, platform 102 monitors the handshake and inventories the added objects. Real time filters support search features and any changes of SLA protection.

Computer System

Figure 9:
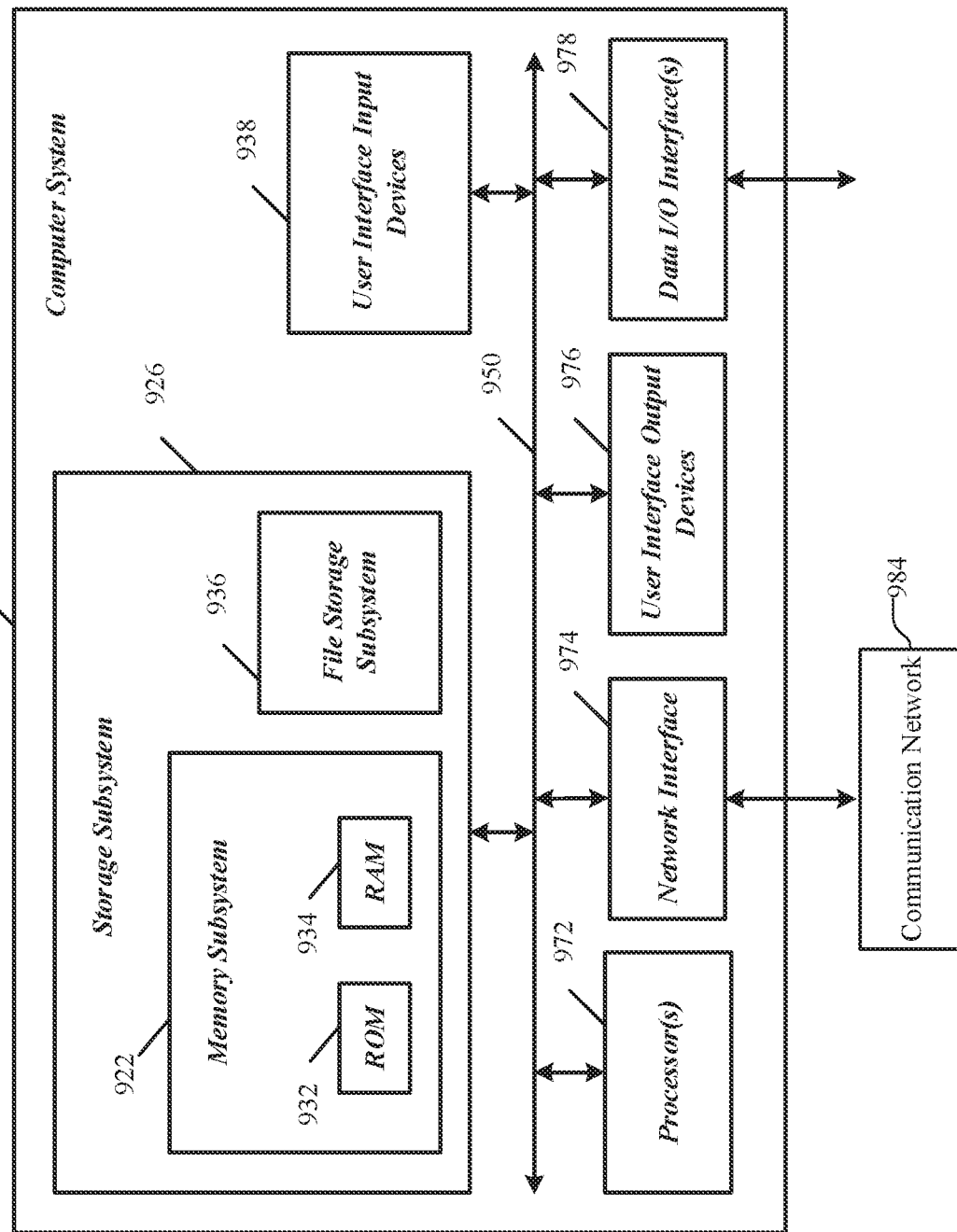
FIG. 9 is a simplified block diagram of a system for identifying historical snapshots for VMs, across machines and in various registration scenarios.

FIG. 9 is a simplified block diagram of an embodiment of a system 900 that can be used keep a snapshot history, stored in sequence, and spanning multiple VMs, even when VMs are unregistered and reregistered and when VMs are moved from one data center to another data center, and to take incremental snapshots across multiple linked VMs. System 900 can be implemented using a computer program stored in system memory, or stored on other memory and distributed as an article of manufacture, separately from the computer system.

Computer system 910 typically includes a processor subsystem 972 which communicates with a number of peripheral devices via bus subsystem 950. These peripheral devices may include a storage subsystem 926, comprising a memory subsystem 922 and a file storage subsystem 936, user interface input devices 938, user interface output devices 978, and a network interface subsystem 976. The input and output devices allow user interaction with computer system 910 and network and channel emulators. Network interface subsystem 974 provides an interface to outside networks and devices of the system 900. The computer system further includes communication network 984 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 938 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 910.

User interface output devices 978 may include a display subsystem, a printer, a fax machine, or non-visual displays such as audio output devices. The display subsystem may include a flat panel device such as a liquid crystal display (LCD) or LED device, a projection device, a cathode ray tube (CRT) or some other mechanism for creating a visible image. The display subsystem may also provide non visual display such as via audio output devices. In general, use of the term "output device" is intended to include all possible types of devices and ways to output information from computer system 910 to the user or to another machine or computer system. The computer system further can include user interface output devices 978 for communication with user equipment.

Storage subsystem 926 stores the basic programming and data constructs that provide the functionality of certain embodiments of the present invention. For example, the various modules implementing the functionality of certain embodiments of the invention may be stored in a storage subsystem 926. These software modules are generally executed by processor subsystem 972.

Storage subsystem 926 typically includes a number of memories including a main random access memory (RAM) 934 for storage of instructions and data during program execution and a read only memory (ROM) 932 in which fixed instructions are stored. File storage subsystem 936 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 936. The host memory storage subsystem 926 contains, among other things, computer instructions which, when executed by the processor subsystem 972, cause the computer system to operate or perform functions as described herein. As used herein, processes and software that are said to run in or on "the host" or "the computer", execute on the processor subsystem 972 in response to computer instructions and data in the host memory storage subsystem 926 including any other local or remote storage for such instructions and data.

Bus subsystem 950 provides a mechanism for letting the various components and subsystems of computer system 910 communicate with each other as intended. Although bus subsystem 950 is shown schematically as a single bus, alternative embodiments of the bus subsystem may use multiple busses.

Computer system 910 itself can be of varying types including a personal computer, a portable computer, a workstation, a computer terminal, a network computer, a television, a mainframe, or any other data processing system or user device. Due to the ever changing nature of computers and networks, the description of computer system 910 depicted in FIG. 9 is intended only as a specific example for purposes of illustrating embodiments of the present invention. Many other configurations of computer system 910 are possible having more or less components than the computer system depicted in FIG. 9.

Some Particular Implementations

Some particular implementations and features are described in the following discussion.

One implementation of the disclosed technology includes a method of identifying historical snapshots for a virtual machine (abbreviated VM), including receiving a request for a historical snapshot of a VM, the request indicating an ID for the VM; detecting that the ID for the VM in the request received is a new ID assigned to a VM by an external machine hosting VMs in a hosted service environment; and determining whether the new ID corresponds to a newly created VM created by the external machine or an existing VM that has been previously registered with the external machine using a previous ID. The method also includes, upon identifying that the new ID corresponds to a newly created VM, creating a new VM Group (abbreviated VMG) object for the newly created VM and corresponding to the new ID; otherwise identifying an existing VMG object for the existing VM; adding the new ID to the existing VMG object; thereby holding identifiers for the newly created VM and the existing VM together in a single object; using the existing VMG object, determining one or more snapshot histories of historical snapshots from snapshot histories stored in association with a previous ID and snapshot histories stored in association with the new ID; and returning at least one historical snapshot from the snapshot histories determined.

In another implementation, the disclosed method can include receiving a refresh trigger for a VM; discovering a VM, with an ID for the discovered VM; detecting that the ID for the VM in the refresh trigger is a new ID assigned to the VM by an external machine hosting VMs in a hosted service environment; and determining whether the new ID corresponds to a newly created VM created by the external machine or an existing VM that has been previously registered with the external machine using a previous ID. The method also includes, upon identifying that the new ID corresponds to a newly created VM, creating a new VM Group (abbreviated VMG) object for the newly created VM and corresponding to the new ID; otherwise identifying an existing VMG object for the existing VM; adding the new ID to the existing VMG object; thereby holding identifiers for the newly created VM and the existing VM together in a single object; using the existing VMG object, determining one or more snapshot histories of historical snapshots from snapshot histories stored in association with a previous ID and snapshot histories stored in association with the new ID; and returning at least one historical snapshot from the snapshot histories determined to refresh the VM.

In yet another implementation, a disclosed method of tracking snapshots and restoring a VM includes allocating a first VM group to track and make available snapshots of VM generations; detecting a first VM that does not belong to any VM group and assigning the first VM as an initial member of the first VM group. The disclosed method also includes detecting a second VM that does not belong to any VM group, determining that it is a successor of the first VM and assigning the second VM to the first VM group. The method further includes creating snapshots of the first and second VMs, optionally creating an initial snapshot of the second VM as an incremental snapshot of the first VM, and linking the snapshots to the first VM group. Additionally included in the disclosed method is making available the snapshots of the first and second VMs in the first VM group, responsive to a request for a snapshot of the second VM that belongs to the first VM group; and instantiating a selected snapshot from the snapshots made available.

In one implementation of the disclosed technology a method of tracking snapshots and restoring a VM includes allocating a first VM group to track and make available snapshots of VM generations; detecting a first VM that does not belong to any VM group and assigning the first VM as an initial member of the first VM group; creating a snapshot of the first VM and linking the snapshot to the first VM group; detecting a second VM that does not belong to any VM group, determining that it is a successor of the first VM, and assigning the second VM to the first VM group; and creating an initial snapshot of the second VM as an incremental snapshot of the first VM based on membership of the second VM in the first VM group and linking the snapshots to the first VM group.

These methods and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations of the disclosed method, some snapshots in a snapshot history are chained to one another and anchored to a VM ID stored in a VMG object.

Some implementations further include consolidating two or more snapshot histories and reporting a consolidated snapshot history for the VM.

Some implementations of the disclosed method further include omitting making a complete backup of a VM determined to be a re-registered VM.

In some implementations, the method further includes searching in multiple snapshot histories of a VMG object, for an unexpired snapshot and when found, making an incremental copy of the VM based upon the unexpired snapshot.

For one disclosed implementation the method for determining whether the new ID corresponds to a new VM includes looking at some property of the VM. In some cases, the property is a universally unique identifier (UUID) of the VM. In another case, the property is a use case identifier that signals an instant recovery request for a specific VM.

For some implementations of the disclosed method, the new ID comprises a managed object reference ID (MOID).

For some implementations, previously registered includes the VM having been moved to a different server in a hosted environment, whereby a VM ID changes.

For other implementations of the disclosed method, previously registered includes the VM having been unregistered and re-registered with a same server in a hosted environment, whereby a VM ID changes. In some cases, the new ID is added as a child node to a VMG object.

Another implementation may include a system, including one or more processors and memory coupled to the processors, containing computer instructions that, when executed on the processors, cause the system to implement a process of identifying historical snapshots for a virtual machine (abbreviated VM), according to any of the methods described earlier.

Yet another implementation may include a non-transitory tangible non-transitory computer readable storage media storing instructions identifying historical snapshots for a virtual machine (abbreviated VM), which instructions, when combined with computer hardware and executed, cause a computer to implement any of the methods described earlier. For purposes of this application, a computer readable media does not include a transitory wave form.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of identifying historical snapshots for a virtual machine (VM), including:
   receiving a request for a historical snapshot of a VM, the request indicating a new ID for the VM;
   determining whether the new ID corresponds to a newly created VM, or an existing VM that has previously been registered at a hosting service using a previous ID, wherein determining whether the ID corresponds to a new VM includes accessing a VM property including use case identifier associated with an instant recovery request;
   based on determining that the new ID corresponds to a newly created VM, creating a new VM Group (VMG) object for the newly created VM;
   based on determining that the new ID corresponds to an existing VM that has been previously registered using the previous ID, identifying an existing VMG object for the existing VM and adding the new ID to the existing VMG object thereby holding the ID and previous ID for the existing VM together in a single object;
   using the new VMG object or existing VMG object, accessing a snapshot history stored in association with the previous ID or a snapshot history stored in association with the new ID and returning at least one unexpired historical snapshot from the accessed snapshot history;
   making an incremental copy of the VM based upon the unexpired historical snapshot, wherein the unexpired historical snapshot is chained to another and is anchored to the previous ID stored in the existing VMG object.

2. The method of claim 1, further including consolidating two or more snapshot histories and reporting a consolidated snapshot history for the VM.

3. The method of claim 1, further including omitting making a complete backup of a VM determined to be a re-registered VM.

4. The method of claim 1, wherein the VM property includes a universally unique identifier (UUID) of the VM.

5. The method of claim 1, wherein the new ID comprises a managed object reference ID (MOID).

6. The method of claim 1, wherein a previous registration of the previously registered VM includes the VM having been moved to a different server in a hosted environment, whereby a VM ID changes.

7. The method of claim 1, wherein a previous registration of the previously registered VM includes the VM having been unregistered and re-registered with a same server in a hosted environment, whereby a VM ID changes.

8. The method of claim 1, wherein the new ID is added as a child node to a VMG object.

9. A system, including one or more processors and memory coupled to the processors, containing computer instructions that, when executed on the one or more processors, cause the system to implement operations in a method of identifying historical snapshots for a virtual machine (VM), the operations comprising, at least:
   receiving a request for a historical snapshot of a VM, the request indicating a new ID for the VM;
   determining whether the new ID corresponds to a newly created VM, or an existing VM that has previously been registered at a hosting service using a previous ID, wherein determining whether the ID corresponds to a new VM includes accessing a VM property including use case identifier associated with an instant recovery request;
   based on determining that the new ID corresponds to a newly created VM, creating a new VM Group (VMG) object for the newly created VM;
   based on determining that the new ID corresponds to an existing VM that has been previously registered using the previous ID, identifying an existing VMG object for the existing VM and adding the new ID to the existing VMG object thereby holding the ID and previous ID for the existing VM together in a single object;
   using the new VMG object or existing VMG object, accessing a snapshot history stored in association with the previous ID or a snapshot history stored in association with the new ID and returning at least one unexpired historical snapshot from the accessed snapshot history;
   making an incremental copy of the VM based upon the unexpired historical snapshot, wherein the unexpired historical snapshot is chained to another and is anchored to the previous ID stored in the existing VMG object.

10. The system of claim 9, wherein the operations further comprise consolidating two or more snapshot histories and reporting a consolidated snapshot history for the VM.

11. The system of claim 9, wherein the operations further comprise omitting making a complete backup of a VM determined to be a re-registered VM.

12. The system of claim 9, wherein the VM property includes a universally unique identifier (UUTD) of the VM.

13. The system of claim 9, wherein the new ID comprises a managed object reference ID (MOID).

14. The system of claim 9, wherein a previous registration of the previously registered VM includes the VM having been moved to a different server in a hosted environment, whereby a VM ID changes.

15. The system of claim 9, wherein a previous registration of the previously registered VM includes the VM having been unregistered and re-registered with a same server in a hosted environment, whereby a VM ID changes.

16. A non-transitory machine-readable medium including instructions which, when read by a machine, cause the machine to perform operations in a method of identifying historical snapshots for a virtual machine (VM), the operations comprising, at least:

receiving a request for a historical snapshot of a VM, the request indicating a new ID for the VM;

determining whether the new ID corresponds to a newly created VM, or an existing VM that has previously been registered at a hosting service using a previous ID, wherein determining whether the ID corresponds to a new VM includes accessing a VM property including use case identifier associated with an instant recovery request;

based on determining that the new ID corresponds to a newly created VM, creating a new VM Group (VMG) object for the newly created VM;

based on determining that the new ID corresponds to an existing VM that has been previously registered using the previous ID, identifying an existing VMG object for the existing VM and adding the new ID to the existing VMG object thereby holding the ID and previous ID for the existing VM together in a single object;

using the new VMG object or existing VMG object, accessing a snapshot history stored in association with the previous ID or a snapshot history stored in association with the new ID and returning at least one unexpired historical snapshot from the accessed snapshot history;

making an incremental copy of the VM based upon the unexpired historical snapshot, wherein the unexpired historical snapshot is chained to another and is anchored to the previous ID stored in the existing VMG object.

17. The medium of claim 16, wherein the operations further comprise consolidating two or more snapshot histories and reporting a consolidated snapshot history for the VM.

18. The medium of claim 16, wherein the operations further comprise omitting making a complete backup of a VM determined to be a re-registered VM.

19. The medium of claim 16, wherein the VM property includes a universally unique identifier (UUTD) of the VM.

20. The medium of claim 16, wherein the new ID comprises a managed object reference ID (MOID).

* * * * *

UNITED STATES PATENT AND TRADEMARK OFFICE
CERTIFICATE OF CORRECTION

| | | |
|---|---|---|
| PATENT NO. | : 10,866,827 B2 | Page 1 of 2 |
| APPLICATION NO. | : 16/453140 | |
| DATED | : December 15, 2020 | |
| INVENTOR(S) | : Al Reza et al. | |

It is certified that error appears in the above-identified patent and that said Letters Patent is hereby corrected as shown below:

On the Title Page

In Column 2, Item (56) under "Other Publications", Line 1, delete "10,310,288," and insert --10,310,888,-- therefor In the Specification In Column 1, Line 30, after "as", insert --full--

In Column 3, Line 24, before "Rubrik", insert --UI for the--

In Column 6, Line 36, delete "VM 3" and insert --VM3-- therefor

In Column 6, Line 43, delete "SI" and insert --S1-- therefor

In Column 6, Line 63, delete "SI" and insert --S1-- therefor

In Column 6, Line 64, delete "SI" and insert --S1-- therefor

In Column 6, Line 66, delete "SI" and insert --S1-- therefor

In Column 6, Line 67, delete "SI" and insert --S1-- therefor

In Column 7, Line 18, delete "month" and insert --year-- therefor

In Column 8, Line 20, delete "is are" and insert --are-- therefor

In Column 10, Line 14, delete "978" and insert --976-- therefor

In Column 10, Line 14, delete "976." and insert --974.-- therefor

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,866,827 B2

In Column 10, Line 37, delete "978" and insert --976-- therefor

In Column 10, Line 49, delete "978" and insert --976-- therefor

In the Claims

In Column 14, Line 67, in Claim 12, delete "(UUTD)" and insert --(UUID)-- therefor In Column 16, Line 25, in Claim 19, delete "(UUTD)" and insert --(UUID)-- therefor